US012653118B2

(12) United States Patent
Rajpoot

(10) Patent No.: US 12,653,118 B2
(45) Date of Patent: Jun. 16, 2026

(54) METHOD AND PROCESS FOR ARTIFICIAL INTELLIGENCE TO MANAGE AND OPTIMIZE ENERGY CONSUMPTION ACROSS VERTICAL FARMING AND GREENHOUSE HYDROPONIC COMBINED CYCLE AGRICULTURE

(71) Applicant: Plant Culture Systems Inc., Irvine, CA (US)

(72) Inventor: Sanjay Kumar Rajpoot, Irvine, CA (US)

(73) Assignee: Plant Culture Systems Inc., Irvine, CA (US)

( * ) Notice: Subject to any disclaimer, the term of this patent is extended or adjusted under 35 U.S.C. 154(b) by 91 days.

(21) Appl. No.: 18/679,807

(22) Filed: May 31, 2024

(65) Prior Publication Data

US 2024/0397886 A1 Dec. 5, 2024

Related U.S. Application Data

(60) Provisional application No. 63/470,366, filed on Jun. 1, 2023.

(51) Int. Cl.
*A01G 31/00* (2018.01)
*A01G 7/02* (2006.01)
(Continued)

(52) U.S. Cl.
CPC ............... *A01G 31/00* (2013.01); *A01G 7/02* (2013.01); *A01G 9/14* (2013.01)

(58) Field of Classification Search
CPC ........... A01G 9/14; A01G 31/00; A01G 9/243
See application file for complete search history.

(56) References Cited

U.S. PATENT DOCUMENTS 10,306,847 B2 6/2019 Whitcher et al.
10,813,295 B2 10/2020 Alexander et al.
(Continued)

FOREIGN PATENT DOCUMENTS

AU 2020401287 A1 6/2022
CA 3064465 C 4/2022
(Continued)

*Primary Examiner* — Joshua D Huson
*Assistant Examiner* — Alanna K Peterson
(74) *Attorney, Agent, or Firm* — Karthik Murthy; Murthy Patent Law Inc.

(57) ABSTRACT

A method for artificial intelligence software to manage and optimize energy consumption across a vertical farm and a greenhouse, comprising: a grid of solar panels that provide solar power, a solar battery and sensors throughout the vertical farm; wherein the greenhouse can be heated or cooled; wherein heating and cooling is managed per type of plant and stage of growth; wherein there is a combined cycle sensor, instrumentation; wherein data from both the vertical farm and the greenhouse is fed into the combined cycle sensor and instrumentation; wherein there is an outdoor light measurement sensor that measures and estimates the conditions of solar power in the solar grid, and sends data to artificial intelligence software; wherein the artificial intelligence software determines how much light various plants in the hydroponic greenhouse needs in order for those plants to maximize the yield from those plants.

20 Claims, 10 Drawing Sheets

AI to manage / optimize energy consumption across Vertical Farming and Greenhouse Hydroponic combined cycle agriculture 201 202 208
203
204 205 206 207

(51) Int. Cl.
  *A01G 9/14* (2006.01)
  *A01G 25/16* (2006.01)

(56) References Cited

U.S. PATENT DOCUMENTS

| | | | |
|---|---|---|---|
| 2010/0263660 A1 | 10/2010 | Thorne | |
| 2013/0204437 A1 | 8/2013 | Koselka et al. | |
| 2015/0196002 A1 | 7/2015 | Friesth | |
| 2016/0113213 A1 | 4/2016 | Berinsky | |
| 2017/0035008 A1 | 2/2017 | Ellins et al. | |
| 2019/0104697 A1 | 4/2019 | Mendes | |
| 2020/0184153 A1 | 6/2020 | Bongartz et al. | |
| 2021/0123771 A1 | 4/2021 | Vega et al. | |
| 2021/0158041 A1 | 5/2021 | Chowdhary et al. | |
| 2021/0195850 A1 | 7/2021 | Hessel et al. | |
| 2021/0298244 A1* | 9/2021 | King | A01G 9/14 |
| 2021/0400885 A1* | 12/2021 | Ouammi | A01G 9/241 |
| 2022/0007589 A1 | 1/2022 | Binney et al. | |
| 2022/0039342 A1 | 2/2022 | Joyner et al. | |
| 2022/0191993 A1 | 6/2022 | Ashdown et al. | |
| 2022/0287249 A1 | 9/2022 | Yehia et al. | |
| 2022/0319165 A1* | 10/2022 | Tran | A01G 25/165 |
| 2022/0408660 A1 | 12/2022 | Yuan | |
| 2023/0074098 A1 | 3/2023 | Hilberg et al. | |
| 2023/0134154 A1 | 5/2023 | Hilberg et al. | |
| 2023/0139163 A1 | 5/2023 | Horowitz et al. | |
| 2023/0143014 A1 | 5/2023 | Nguyen et al. | |
| 2023/0216442 A1* | 7/2023 | Hinson | H02S 30/10 136/243 |
| 2023/0232753 A1 | 7/2023 | Sweeney et al. | |
| 2023/0337607 A1* | 10/2023 | Rankin | A01G 9/243 |

FOREIGN PATENT DOCUMENTS

| | | | |
|---|---|---|---|
| CN | 102657037 A | 9/2012 | |
| CN | 207115223 U | 3/2018 | |
| CN | 109003198 A | 12/2018 | |
| CN | 208673173 U | 3/2019 | |
| CN | 114679963 A | 7/2022 | |
| CN | 115708476 A | 2/2023 | |
| GB | 2572127 A | 9/2019 | |
| KR | 20200103823 A | 9/2020 | |
| RO | 135499 A2 | 1/2022 | |
| TW | 202110320 A | 3/2021 | |
| WO | 2016138545 A1 | 9/2016 | |
| WO | 2023081511 A1 | 5/2023 | |
| WO | 2023107340 A1 | 6/2023 | |
| WO | WO-2023235593 A1 * | 12/2023 | H02J 3/381 |

* cited by examiner

METHOD AND PROCESS FOR ARTIFICIAL INTELLIGENCE TO MANAGE AND OPTIMIZE ENERGY CONSUMPTION ACROSS VERTICAL FARMING AND GREENHOUSE HYDROPONIC COMBINED CYCLE AGRICULTURE

FIELD OF THE INVENTION

The present invention relates to a method and process for artificial intelligence ("AI") to manage and optimize energy consumption across vertical farming and greenhouse hydroponic combined cycle agriculture.

BACKGROUND

The background description includes information that may be useful in understanding the present invention. It is not an admission that any of the information provided herein is prior art or relevant to the presently claimed invention, or that any publication specifically or implicitly referenced is prior art.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply. The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about."

Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable.

The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an" and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "Such as") provided with respect to certain embodiments herein is intended merely to better illuminate the invention and does not pose a limitation on the scope of the invention otherwise claimed.

No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any Such inclusion or deletion occurs, the specification is herein deemed to contain the group as modified thus fulfilling the written description of all Markush groups used in the appended claims.

Energy is the most expensive expense on any farms with vertical lighting. Today farms use an excessive amount of energy, as in more than is necessary to optimally grow their crops. In some cases, energy can account for as much as 31% of the expense of running a farm.

Although farming outdoors is lower cost than vertical farming, the outdoor space for farming is typically far away from major metro centers that consume most of the products from a particular farm. Indeed, sometimes fruits or vegetables may be shipped several thousand miles, resulting in additional pollution and worsening climate change.

Climate change is also increasing heat and lower freshwater availability throughout the earth, both of which are harmful to farming.

SUMMARY

The present invention solves these issues, because the present invention creates the lowest energy usage crop with the optimal photosynthetic yield indoor and outdoors.

There is no vertical farm that uses 100% renewable energy. There is also no vertical farm that optimally utilizes sunlight. The present invention does use 100% renewable energy and does optimize the use of sunlight for solar power.

A vertical farm in a container can easily be placed in a major metro area. In alternative embodiments, instead of a vertical farm there is a nursery. A hydroponic greenhouse can similarly be placed on rooftops or even individual dwellings.

Vertical farms and solar power together can be expensive, and therefore there is a need to optimize the use of the energy from solar power, and to maximize the yield of the crops grown.

The present invention is the most cost effective use of hydroponics in which a combination of indoor farming and a hydroponic greenhouse receive power from solar power. In places such as the middle east or California, that have increased levels of heat and less water due to climate change, the present invention could utilize the high amount of solar energy in order to produce crops locally, as opposed to importing crops from thousands of miles away.

BRIEF DESCRIPTION OF THE DRAWINGS

Many aspects of the present disclosure can be better understood with reference to the attached drawings. The components in the drawings are not necessarily drawn to scale, with emphasis instead being placed upon clearly illustrating the principles of the disclosure. Moreover, in the drawings, like reference numerals designate corresponding parts throughout several views.

DETAILED DESCRIPTION

Figure 1:
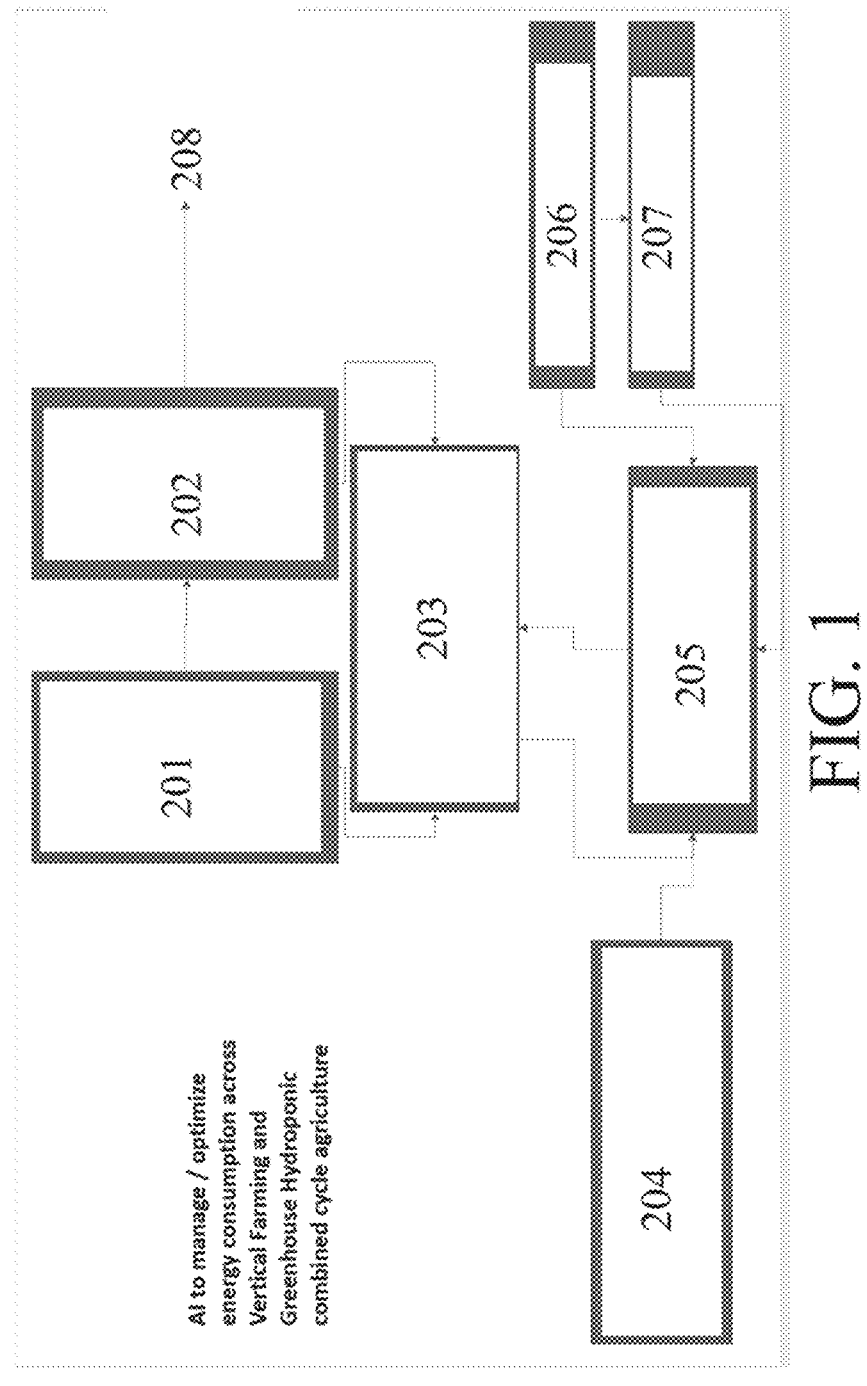
FIG. 1 is a drawing of a method and process for artificial intelligence to manage and optimize energy consumption across vertical farming and greenhouse hydroponic combined cycle agriculture according to various embodiments of the present disclosure.

Various embodiments of the present disclosure relate to providing a method and process for artificial intelligence to manage and optimize energy consumption across vertical farming and greenhouse hydroponic combined cycle agriculture.

There is a vertical farm and a hydroponic greenhouse, both with sensors and controls throughout, and utilized in combination. In alternative embodiments, instead of a vertical farm there is a nursery. Both the vertical farm and hydroponic greenhouse send data to an Artificial intelligence energy optimization software.

Artificial intelligence is intelligence exhibited by machines, particularly computers. It includes software that enables machines to perceive their environment and uses learning and intelligence to take action that maximizes the chances of achieving defined goals. One form of AI is machine learning, which includes statistical algorithms that can learn from data and generalize to unseen data, and thus perform tasks without explicit instructions. Training data is sometimes provided so as to ensure that an AI software based on machine learning learns the right lessons. Another form of AI is neural networks, which is a model inspired by the structure of a brain. AI based on neural networks includes nodes called artificial neurons, which are modeled on neurons in the brain. These are connected by edges, which model synapses in the brain. Each artificial neuron receives signals from connected neurons, then processes them and sends a signal to other connected neurons. The "signal" is a real number, and the output of each neuron is computed by some non-linear function of the sum of its inputs, called the activation function. The strength of the signal at each connection is determined by a weight, which adjusts during the learning process. Typically, neurons are aggregated into layers. Different layers may perform different transformations on their inputs. Signals travel from the first layer (the input layer) to the last layer (the output layer), possibly passing through multiple intermediate layers (hidden layers). A network is typically called a deep neural network if it has at least 2 hidden layers. Machine learning that uses a deep neural network is called deep learning.

Solar power is absorbed through a solar grid of solar panels. The solar grid measures solar yield data. There is a solar battery storing some energy absorbed by the solar grid.

Plants start as seedlings and plugs, where plugs in horticulture are small sized seedlings grown in seed trays filled with potting soil. In one embodiment of the present invention, the seedlings and plugs start in a large container, similar or identical to a standard shipping container. In another embodiment of the present invention, the vertical farm may be built into the greenhouse without a container. They are spaced close together. Once a plant grows past seedling stage, the plant is moved to a greenhouse and put into a planting medium.

The planting medium could be deep water culture or nutrient film technique ("NFT"), or ebb & flow, or rockwool slab, or Dutch bucket. Plants are transferred from germination indoor vertical hydroponics to seedling that are planted in greenhouse hydroponic systems. In one embodiment of the present invention, the plants get spaced out in a less dense manner than in the container, so that they have room to grow to full size. In another embodiment of the present invention, the vertical farm can be preserved without replanting.

Solar energy is used to power the container and greenhouse. Power use includes heating, cooling and pumps. Light is provided through sunlight in the greenhouse. Lights may be supplemented with artificial lights when sunlight is insufficient, such as when there are storms or it is mid-winter far from the equator. The solar grid charges a solar battery.

The battery lasts the longest when it is kept at a 60-80% charge. Artificial intelligence energy optimization software balances the load such that power goes directly from the solar grid to the heating, cooling and pumps, and is balanced with charging the solar battery. The solar battery sends batter percentage data to the artificial intelligence energy optimization software.

The second best optimal range for a battery to last long is 20-60% charge.

Fertilizer is added as needed both at the seedling stage and later. Either chemical fertilizer or organic fertilizer can be used depending on what's best for each type of plant.

Heating and cooling is managed per type of plant and stage of growth. Seedlings of certain plants need to be at a certain temperature. While other stages of growth will require different temperatures, and different plants will require different temperatures at each stage. Typically plants can tolerate more heat as they grow toward maturity.

There is a combined cycle sensor, instrumentation and control. There is also an outdoor light measurement sensor and instrumentation. Data from both the vertical farm and the hydroponic greenhouse is fed into the combined cycle sensor and instrumentation. Data from the outdoor light measurement sensor and instrumentation is fed into the artificial intelligence energy optimization software. The outdoor light measurement sensor and instrumentation measures an estimated photosynthetic and solar power generating yield. The outdoor light measurement sensor and instrumentation also measures the amount of photosynthetic active radiation ("PAR") and the amount of overall flow of radiation. The data from the outdoor light measurement sensor and instrumentation will allow the artificial intelligence energy optimization software to determine how much light various plants in the hydroponic greenhouse needs. The outdoor light measurement sensor and instrumentation will also measure and estimate the conditions of solar power in the solar grid.

Photosynthetic active radiation tells the artificial intelligence energy optimization software how much light is available from the sun for the plants to grow. Then if more lights need to be turned on in order to maximize the yield of a particular crop, then artificial intelligence energy optimization software will turn on more lights until the amount of light reaching a particular crop will result in a maximum yield of that crop. Alternatively, if lights need to be turned off in order to maximize the yield of a particular crop, then artificial intelligence energy optimization software will turn off more lights until the amount of light reaching a particular crop will result in a maximum yield of that crop.

The combined cycle sensor, instrumentation and control measure air temperature, water temperature, time that the lighting is on or off, flow rate sensors, amount of Carbon dioxide, humidity, nutrient solution, electrical conductivity and pH.

The combined cycle sensor, instrumentation and control sends data to the Artificial intelligence energy optimization software.

The Artificial intelligence energy optimization software sends data to the combined cycle sensor, instrumentation and control, in which it tells the combined cycle sensor, instrumentation and control what to do.

There is a no-network artificial intelligence architecture that integrates the solar grid with real time data, the solar battery with real time data, and the outdoor light measurement sensor and instrumentation with real time data.

The Artificial intelligence energy optimization software analyzes the input from the vertical farm, the hydroponic greenhouse, the solar grid and the solar battery in order to optimize conditions in the vertical farm and hydroponic greenhouse to maximize yields of the crops planted therein. The Artificial intelligence energy optimization software performs this optimization by changing heating, cooling, flow rates, lighting, amount of Carbon dioxide, humidity, nutrient solution, electrical conductivity and pH. It makes these changes based on what is optimal for the yield of each plant at each stage of that's plant's life. It attempts to minimize overall energy expenditure per crop.

The vertical farm and hydroponic greenhouse function with the artificial intelligence energy optimization software year round. The artificial intelligence energy optimization software always tries to maximize the yield of the crops growing in the vertical farm.

If a sensor detects that there is too much carbon dioxide for a particular plant, the Artificial intelligence energy optimization software will open a vent in order to reduce carbon dioxide until the sensor communicates that the optimal amount of carbon dioxide for a particular plant has been reached.

If a sensor detects that there is too much humidity for a particular plant, the Artificial intelligence energy optimization software will either turn on a fan near that plant, or turn on a dehumidifier near that plant, or put a cooling pad near that plant, in order to reduce humidity until the sensor communicates that the optimal amount of humidity for a particular plant has been reached. Alternatively, If a sensor detects that there is too much humidity for a particular plant, and a sensor detects that the outdoors is not humid, then the Artificial intelligence energy optimization software will open a vent to help lower humidity until the sensor communicates that the optimal amount of humidity for a particular plant has been reached.

If a sensor detects that the air is too hot for a particular plant, the Artificial intelligence energy optimization software will either turn on air conditioning near that plant, or if a sensor detects that the outdoors is less hot than the air inside, then the Artificial intelligence energy optimization software will open a vent to help lower temperature until the sensor communicates that the optimal temperature for a particular plant has been reached.

If a sensor detects that the air is too cold for a particular plant, the Artificial intelligence energy optimization software will either turn on a heater near that plant, or if a sensor detects that the outdoors is less cold than the air inside, then the Artificial intelligence energy optimization software will open a vent to help increase temperature until the sensor communicates that the optimal temperature for a particular plant has been reached.

If a sensor detects that water is too hot for a particular plant, the Artificial intelligence energy optimization software will turn on a chiller for water going to that plant until the sensor communicates that the optimal temperature for water going to a particular plant has been reached.

If a sensor detects that water is too cold for a particular plant, the artificial intelligence energy optimization software will turn on a water heater for water going to that plant until the sensor communicates that the optimal temperature for water going to a particular plant has been reached.

If a sensor detects that nutrient solution is lacking in an amount of certain ingredients for a particular plant, the artificial intelligence energy optimization software will direct a machine to add those ingredients to the nutrient solution going to that plant until the sensor communicates that the optimal level of ingredients for nutrient solution going to a particular plant has been reached.

If a sensor detects that nutrient solution is too high in an amount of certain ingredients for a particular plant, the artificial intelligence energy optimization software will direct a machine to remove those ingredients for the nutrient solution going to that plant until the sensor communicates that the optimal level of ingredients for nutrient solution going to a particular plant has been reached.

If a sensor detects that electrical conductivity is too low in Siemens per meter for a particular plant, the artificial intelligence energy optimization software will direct a machine to increase Siemens per meter in the electrical conductivity going to that plant until the sensor communicates that the optimal level of Siemens per meter for electrical conductivity going to a particular plant has been reached.

If a sensor detects that electrical conductivity is too high in Siemens per meter for a particular plant, the artificial intelligence energy optimization software will direct a machine to decrease Siemens per meter in the electrical conductivity going to that plant until the sensor communicates that the optimal level of Siemens per meter for electrical conductivity going to a particular plant has been reached.

If a sensor detects that pH is too low in a particular plant, the artificial intelligence energy optimization software will direct a machine to add base liquid to the plant to increase pH in that plant until the sensor communicates that the optimal level of pH in a particular plant has been reached.

If a sensor detects that pH is too high in a particular plant, the artificial intelligence energy optimization software will direct a machine to add acid liquid to the plant to decrease pH in that plant until the sensor communicates that the optimal level of pH in a particular plant has been reached.

The artificial intelligence energy optimization software utilizes different kinds of artificial intelligence depending on different situations. The artificial intelligence energy optimization software can utilize either machine learning, deep learning, neural networks or any neural network architecture that is useful.

The solar battery may never reach 100% charge. If the solar battery reaches 1%, the artificial intelligence energy optimization software may stop putting energy from the solar grid into the vertical farm and hydroponic greenhouse, and instead focus on charging the solar battery. Alternatively, if the solar battery is at 80% or more, the artificial intelligence energy optimization software may put all of the solar grid's energy into the vertical farm and hydroponic greenhouse and not charge the solar battery until the solar battery drops to 60%. If a solar battery gets charged over 100%, it could cause battery damage, battery degradation and potentially a fire. Therefore, if the solar battery ever reaches 99% charge, energy from the solar grid will stop charging the solar battery, and will instead focus on powering the vertical farm and hydroponic greenhouse.

The outdoor light measurement sensor and instrumentation also measures all available energy for solar conversion. The outdoor light measurement sensor sends this data to the artificial intelligence energy optimization software, which estimates yields for the solar grid. This data can be available in real time. One unit of measurement of the energy from the solar grid is kilowatt-hours.

Different crops that can be grown utilizing the present invention are lettuce, tomatoes, leafy green crops, and vine crops. Many other fruits, vegetables, lentils and other plants can also be grown utilizing the present invention.

In one embodiment of the invention, the artificial intelligence energy optimization software balances energy generation from the solar grid, energy storage in the solar battery, and energy consumption in the vertical farm and hydroponic greenhouse, in order to maximize yields of the crops grown in the vertical farm and hydroponic greenhouse.

In one embodiment of the invention, the solar battery has a backup supply of energy. In an environment that is not so sunny, an increase in the solar grid can compensate for lower amounts of sunlight, and still provide enough energy to run the vertical farm, hydroponic greenhouse and artificial intelligence energy optimization software. In alternative embodiments, instead of a vertical farm there is a nursery.

Figure 2:
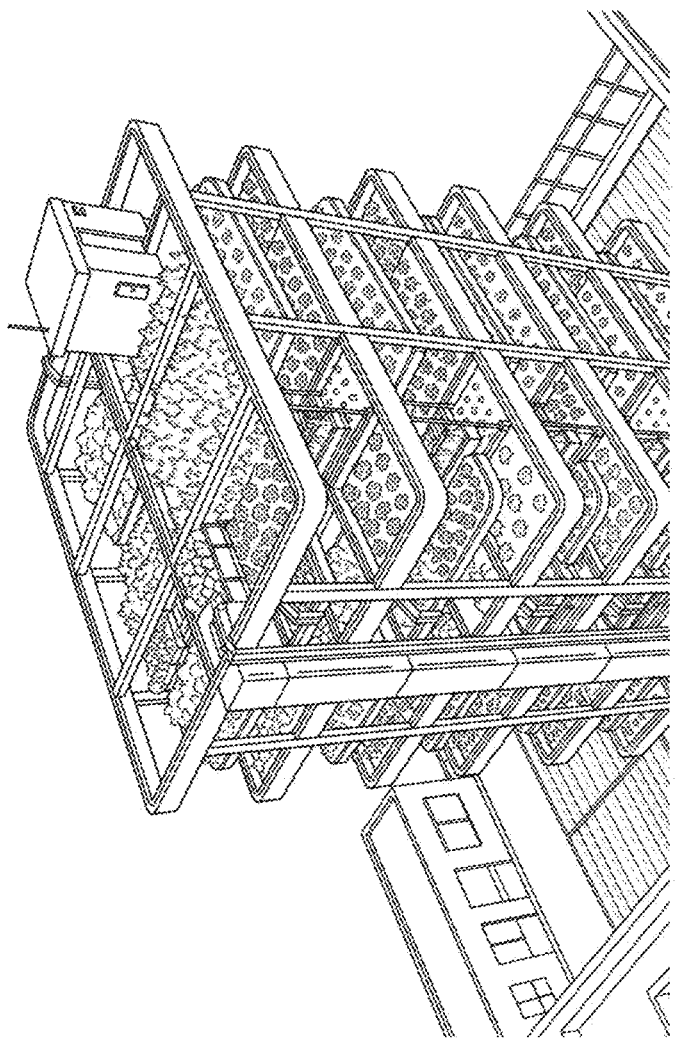
FIG. 2 is a drawing of a method and process for artificial intelligence to manage and optimize energy consumption across vertical farming and greenhouse hydroponic combined cycle agriculture according to various embodiments of the present disclosure.

FIG. 1 is a flowchart of one embodiment of the present invention, showing how the AI software interacts with the vertical farm and hydroponic greenhouse. There is vertical farm input of seed, fertilizer, heating, cooling, pumps and lights 201. There is hydroponic greenhouse input of seedling, fertilizer, heating, cooling, and pumps 202. There is combined cycle sensor/instrumentation & control of air temperature (heating or cooling or venting), water temperature (heater or chiller on and off), lighting on and off, flow rate sensors, carbon dioxide on or vent release, humidity (fan and pad cooling or dehumidifier or open greenhouse windows), nutrient solution electrical conductivity, and ph 203. There is an outdoor light measurement sensor and instrumentation that gives estimated photosynthetic and solar power generating yield 204. There is AI energy optimization including balancing energy generation, energy storage and energy consumption 205. There is a solar grid of solar panels giving solar yield data 206. There is a solar battery storing energy from the solar panels and giving battery percentage data 207. FIG. 2 displays an image of a vertical farm.

Figure 3:
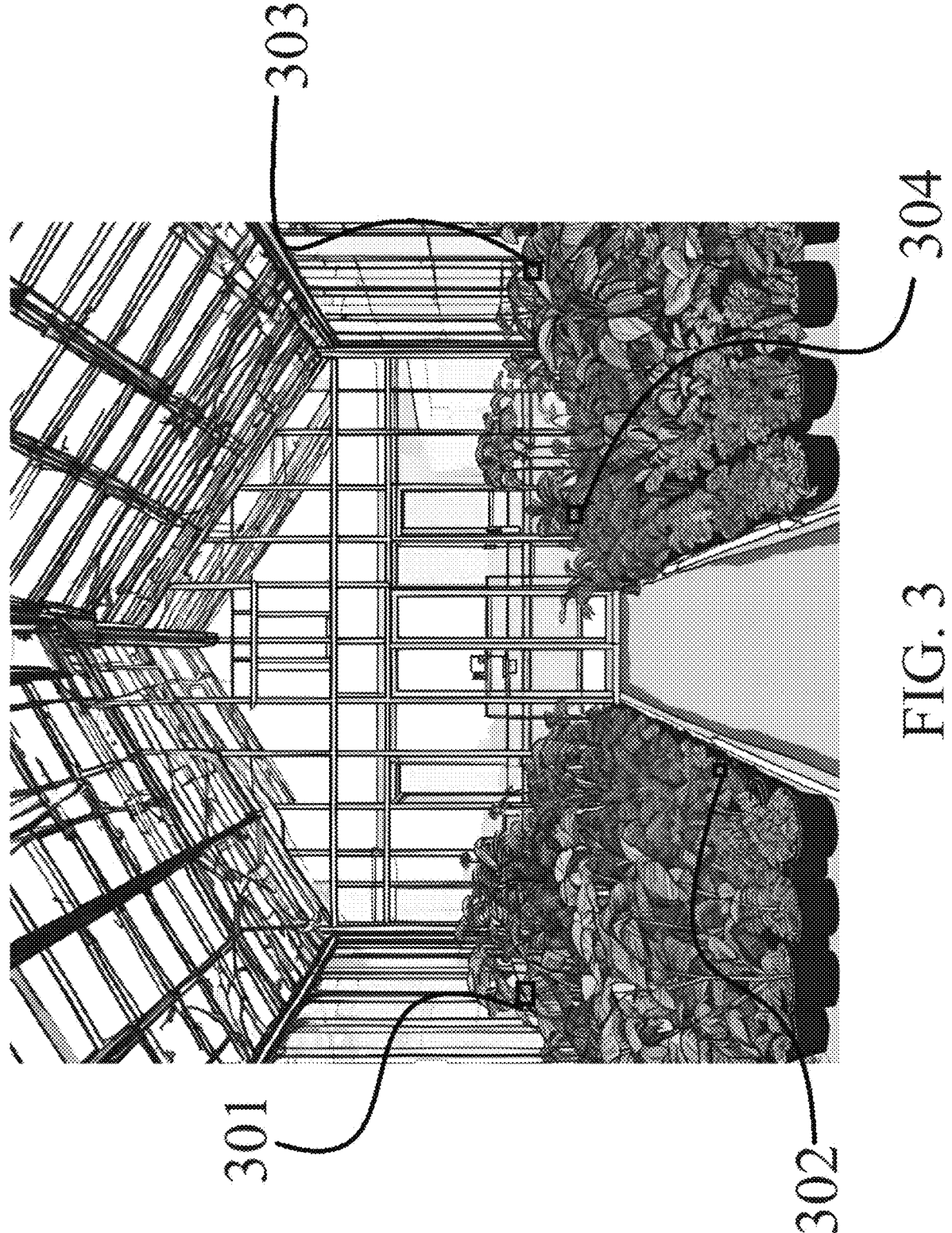
FIG. 3 is a drawing of a method and process for artificial intelligence to manage and optimize energy consumption across vertical farming and greenhouse hydroponic combined cycle agriculture according to various embodiments of the present disclosure.

FIG. 3 displays sensors throughout the greenhouse. There is humidity sensor 301, soil pH sensor 302, temperature sensor 303 and flow rate sensor 304. These sensors can be interchanged and go in different places throughout the greenhouse and vertical farm.

Figure 4:
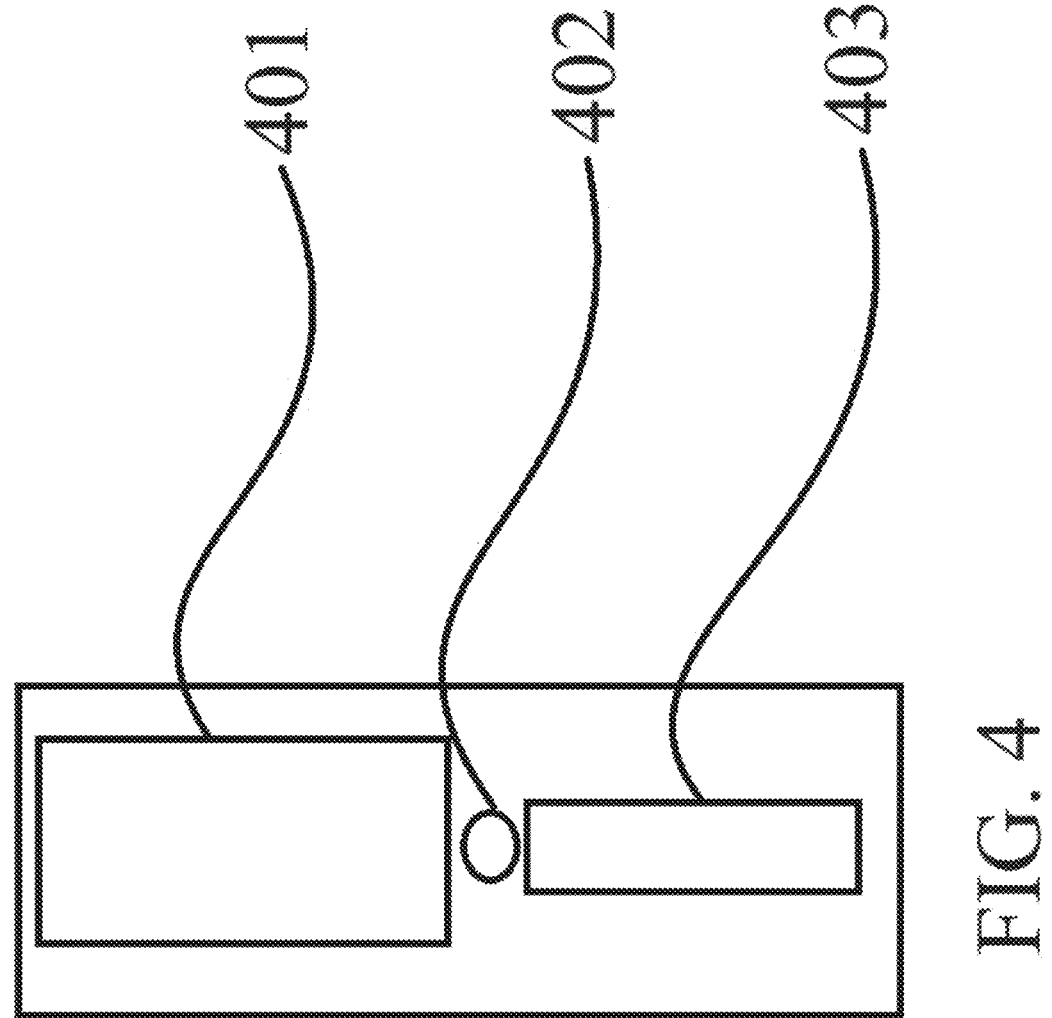
FIG. 4 is a drawing of a method and process for artificial intelligence to manage and optimize energy consumption across vertical farming and greenhouse hydroponic combined cycle agriculture according to various embodiments of the present disclosure.

FIG. 4 displays an outdoor light measurement sensor of PAR. Sensor 401 absorbs UV light across the color spectrum and analyzes the UV light. Sensor 402 also absorbs UV light and analyzes it. Display 403 displays the analysis of PAR based on sensor 401 and sensor 402.

Figure 5:
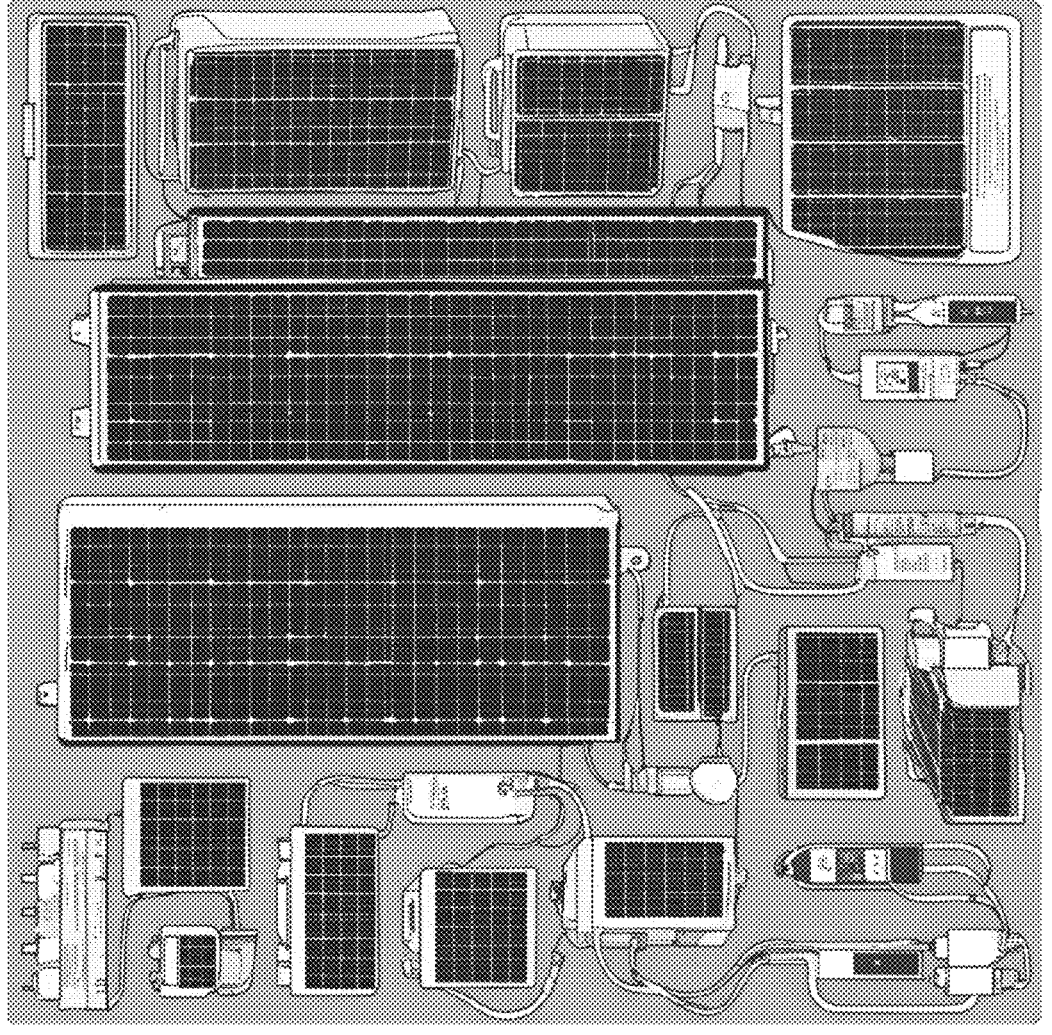
FIG. 5 is a drawing of a method and process for artificial intelligence to manage and optimize energy consumption across vertical farming and greenhouse hydroponic combined cycle agriculture according to various embodiments of the present disclosure.

FIG. 5 shows multiple solar batteries and solar panels in a grid formation.

Figure 6:
FIG. 6 is a drawing of a method and process for artificial intelligence to manage and optimize energy consumption across vertical farming and greenhouse hydroponic combined cycle agriculture according to various embodiments of the present disclosure.
Figure 7:
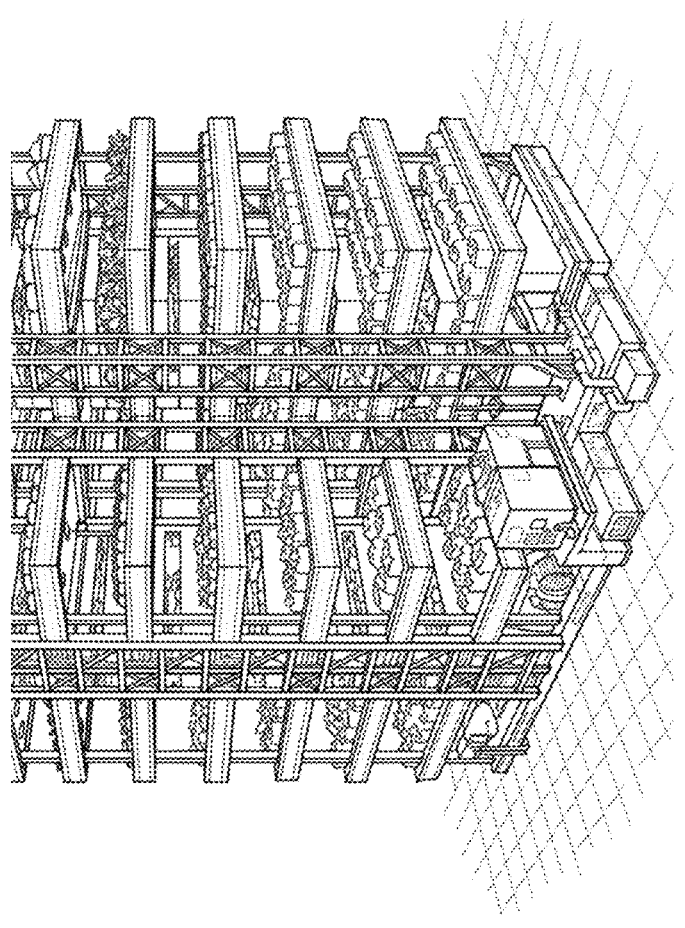
FIG. 7 is a drawing of a method and process for artificial intelligence to manage and optimize energy consumption across vertical farming and greenhouse hydroponic combined cycle agriculture according to various embodiments of the present disclosure.
Figure 8:
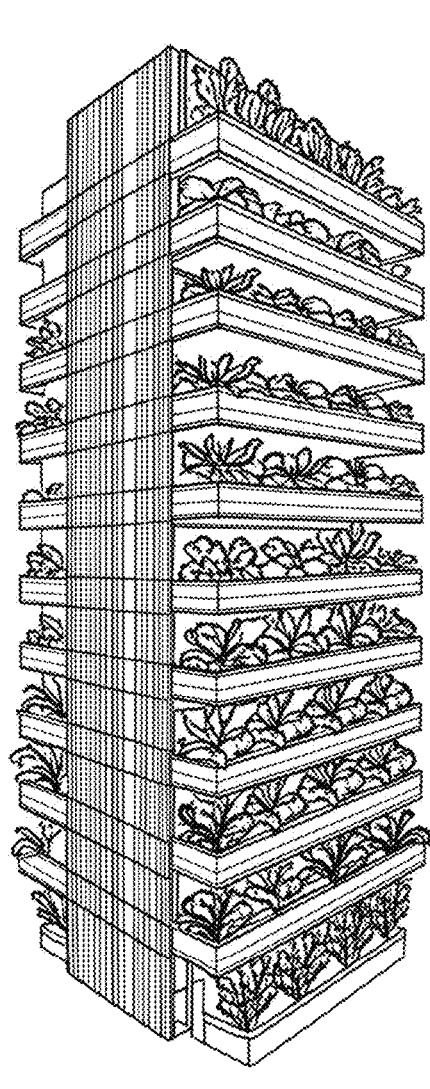
FIG. 8 is a drawing of a method and process for artificial intelligence to manage and optimize energy consumption across vertical farming and greenhouse hydroponic combined cycle agriculture according to various embodiments of the present disclosure.
Figure 9:
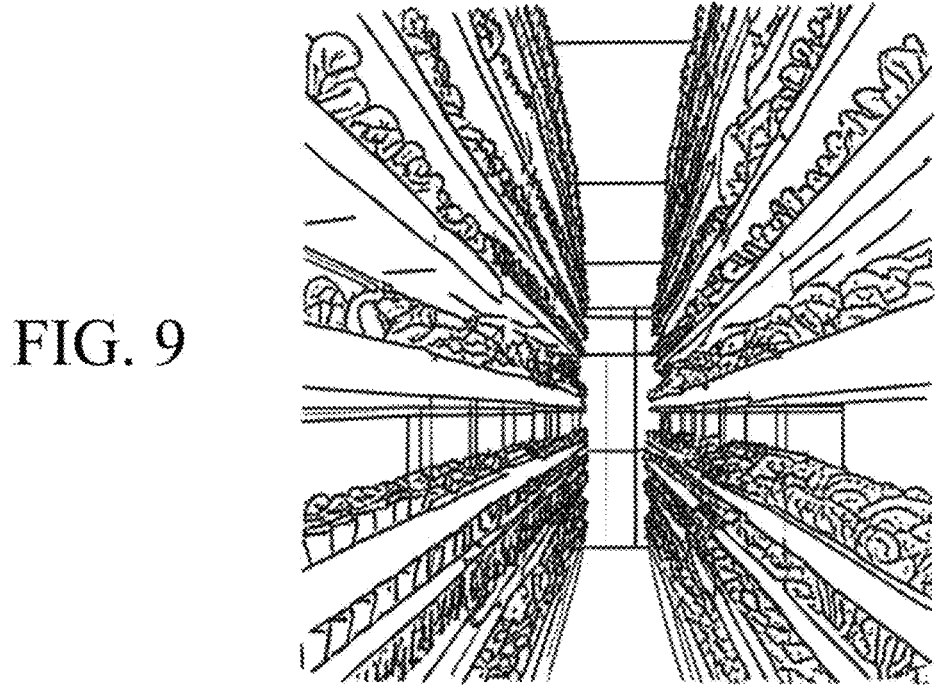
FIG. 9 is a drawing of a method and process for artificial intelligence to manage and optimize energy consumption across vertical farming and greenhouse hydroponic combined cycle agriculture according to various embodiments of the present disclosure.
Figure 10:
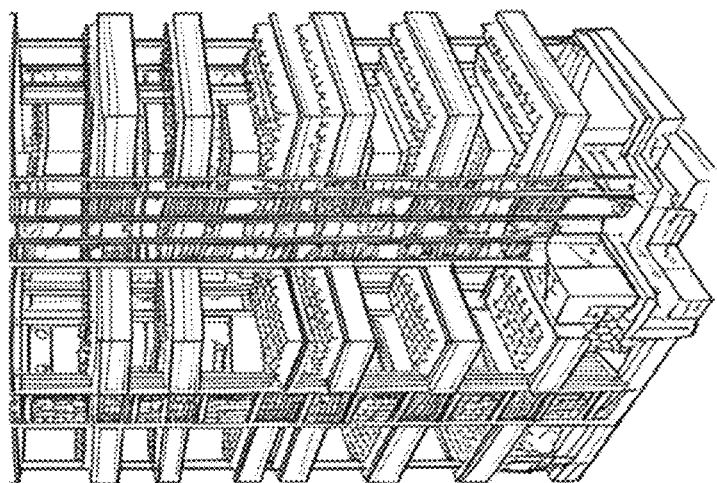
FIG. 10 is a drawing of a method and process for artificial intelligence to manage and optimize energy consumption across vertical farming and greenhouse hydroponic combined cycle agriculture according to various embodiments of the present disclosure.

FIG. 6 shows a sensor measuring the pH of soil either in the greenhouse or vertical farm.

FIGS. 7 through 10 are different images of a vertical farm. These are different arrangements of a vertical farm, and different sensors can be placed in a variety of different places on these vertical farms, depending on where those sensors get an accurate measurement.

Each of the additional embodiments below can be combined with each other in any combination. Also, in each of the embodiments below a vertical farm can be replaced with a nursery. Furthermore, every embodiment described can be combined with 1 or more other embodiments in any combination.

In one additional embodiment, there is a method for artificial intelligence software to manage and optimize energy consumption across vertical farming and a greenhouse, comprising: a grid of solar panels that provide solar power; a solar battery that can store solar power from the grid of solar panels; wherein there are sensors throughout the vertical farm; wherein the vertical farm and greenhouse can be heated or cooled; wherein Heating and cooling is managed per type of plant and stage of growth; wherein there is a combined cycle sensor, instrumentation; wherein data from both the vertical farm and the greenhouse is fed into the combined cycle sensor and instrumentation; wherein there is an outdoor light measurement sensor; wherein the outdoor light measurement sensor will measure photosynthetic active radiation ("PAR"); wherein the outdoor light measurement sensor will also measure and estimate the conditions of solar power in the solar grid; wherein data from the outdoor light measurement sensor is sent to artificial intelligence software; wherein the artificial intelligence software determines how much light various plants in the hydroponic greenhouse needs in order for those plants to maximize the yield from those plants.

In one additional embodiment, there is a method for artificial intelligence software to manage and optimize energy consumption across vertical farming and a greenhouse, comprising: A sensor to measure carbon dioxide; wherein the sensor sends data to the artificial intelligence software; wherein the artificial intelligence software utilizes this data and makes adjustments to the conditions in the vertical farm and greenhouse in order to maximize yield of the plants.

In one additional embodiment, there is a method for artificial intelligence software to manage and optimize energy consumption across vertical farming and a greenhouse, comprising: a sensor to measure pH of the soil the plants are in; wherein the sensor sends data to the artificial intelligence software; wherein the artificial intelligence software utilizes this data and makes adjustments to the conditions in the vertical farm and greenhouse in order to maximize yield of the plants.

In one additional embodiment, there is a method for artificial intelligence software to manage and optimize energy consumption across vertical farming and a greenhouse, comprising: a sensor to measure humidity in the greenhouse; wherein the sensor sends data to the artificial intelligence software; wherein the artificial intelligence software utilizes this data and makes adjustments to the conditions in the greenhouse in order to maximize yield of the plants.

In one additional embodiment, there is a method for artificial intelligence software to manage and optimize energy consumption across vertical farming and a greenhouse, comprising: a sensor to measure nutrient solution in the plants in the greenhouse; wherein the sensor sends data to the artificial intelligence software; wherein the artificial intelligence software utilizes this data and makes adjustments to the conditions in the greenhouse in order to maximize yield of the plants.

In one additional embodiment, there is a method for artificial intelligence software to manage and optimize energy consumption across vertical farming and a greenhouse, comprising: wherein the type of artificial intelligence is machine learning.

In one additional embodiment, there is a method for artificial intelligence software to manage and optimize energy consumption across vertical farming and a greenhouse, comprising: wherein the type of artificial intelligence is deep learning.

In one additional embodiment, there is a method for artificial intelligence software to manage and optimize energy consumption across vertical farming and a greenhouse, comprising: wherein the type of artificial intelligence is neural networks.

In one additional embodiment, there is a method for artificial intelligence software to manage and optimize energy consumption across vertical farming and a greenhouse, comprising: wherein some of the changes the artificial intelligence software can make to both the vertical farm and the greenhouse include:

changing the temperature, changing flow rates of water or other liquids, changing lighting, changing carbon dioxide levels, changing humidity, changing nutrient solution for each plant, changing electrical conductivity; and changing pH of either the soil or water for the plants.

In one additional embodiment, there is a method for artificial intelligence software to manage and optimize energy consumption across vertical farming and a greenhouse, comprising: wherein the greenhouse can include hydroponic plants.

In one additional embodiment, there is a method for artificial intelligence software to manage and optimize energy consumption across vertical farming and a greenhouse, comprising: wherein the greenhouse can include aquaponic plants.

In one additional embodiment, there is a method for artificial intelligence software to manage and optimize energy consumption across vertical farming and a greenhouse, comprising: a sensor to measure carbon dioxide; wherein the sensor sends data to the artificial intelligence software; wherein the artificial intelligence software utilizes this data and makes adjustments to the conditions in the vertical farm and greenhouse in order to maximize yield of the plants; a sensor to measure pH of the soil the plants are in; wherein the sensor sends data to the artificial intelligence software; wherein the artificial intelligence software utilizes this data and makes adjustments to the conditions in the vertical farm and greenhouse in order to maximize yield of the plants; a sensor to measure humidity in the greenhouse; wherein the sensor sends data to the artificial intelligence software; wherein the artificial intelligence software utilizes this data and makes adjustments to the conditions in the greenhouse in order to maximize yield of the plants; a sensor to measure nutrient solution in the plants in the vertical farm and greenhouse; wherein the sensor sends data to the artificial intelligence software; wherein the artificial intelligence software utilizes this data and makes adjustments to the conditions in the greenhouse in order to maximize yield of the plants; wherein the type of artificial intelligence is machine learning; wherein the type of artificial intelligence is deep learning; wherein the type of artificial intelligence is neural networks; and wherein some of the changes the artificial intelligence software can make to both the vertical farm and the greenhouse include: changing the temperature, changing flow rates of water or other liquids, changing lighting, changing Carbon dioxide levels, changing humidity, changing nutrient solution for each plant, changing electrical conductivity; and changing pH of either the soil or water for the plants.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

The invention claimed is:

1. A method for artificial intelligence software to manage and optimize energy consumption across a nursery and a greenhouse, comprising:

a grid of solar panels that provide solar power;

a solar battery that stores solar power from the grid of solar panels;

wherein there are sensors throughout the nursery and the greenhouse;

wherein there are internal sensors in the greenhouse;

wherein the internal sensors measure air temperature, water temperature, time that lighting is on or off, flow rate, amount of carbon dioxide, humidity, nutrient solution, electrical conductivity of the nutrient solution and pH all within the greenhouse;

wherein the nursery and greenhouse include an ability to change temperature;

wherein heating and cooling is managed per type of plant and stage of growth;

wherein internal sensors sense environmental conditions in the greenhouse and nursery;

wherein there is an outdoor light measurement sensor;

wherein the outdoor light measurement sensor will measure photosynthetic active radiation ("PAR") outdoors;

wherein the outdoor light measurement sensor will also measure light;

wherein data from the outdoor light measurement sensor is sent to artificial intelligence software;

wherein the artificial intelligence software determines how much light various plants in the hydroponic greenhouse needs in order for those plants to maximize the yield from those plants;

wherein the solar battery sends battery percentage data to the artificial intelligence software;

wherein the artificial intelligence software balances power going directly from the grid of solar panels to heating, cooling and pumps, and is balanced with charging the solar battery; and wherein the artificial intelligence software optimizes using sunlight for solar power and optimizes energy consumption in the greenhouse.

2. The method of claim 1, further comprising:

wherein the sensor sends data to the artificial intelligence software;

wherein the artificial intelligence software utilizes this data and makes adjustments to the conditions in the vertical farm and greenhouse in order to maximize yield of the plants.

3. The method of claim 1, further comprising:

a sensor to measure pH of soil the plants are in;

wherein the sensor sends data to the artificial intelligence software;

wherein the artificial intelligence software utilizes this data and makes adjustments to the conditions in the vertical farm and greenhouse in order to maximize yield of the plants.

4. The method of claim 1, further comprising:

a sensor to measure humidity in the nursery and greenhouse;

wherein the sensor sends data to the artificial intelligence software;

wherein the artificial intelligence software utilizes this data and makes adjustments to the conditions in the greenhouse in order to maximize yield of the plants.

5. The method of claim 1, further comprising:

a sensor to measure ingredients in a nutrient solution in the plants in the nursery and greenhouse;

wherein the sensor sends data to the artificial intelligence software;

wherein the artificial intelligence software utilizes this data and makes adjustments to the conditions in the greenhouse in order to maximize yield of the plants.

6. The method of claim 1, further comprising:

wherein the type of artificial intelligence is machine learning.

7. The method of claim 1, further comprising:

wherein the type of artificial intelligence is deep learning.

8. The method of claim 1, further comprising:

wherein the type of artificial intelligence is neural networks.

9. The method of claim 1, further comprising:

wherein some of the changes the artificial intelligence software are made to both the vertical farm and the greenhouse include:

controlling liquid pumps to change flow rates of water or other liquids, and controlling lights to change lighting.

10. The method of claim 1, further comprising:

wherein the greenhouse allows plants to be grown hydroponically.

11. The method of claim 1, further comprising:

wherein the greenhouse allows plants to be grown aquaponically.

12. The method of claim 1, further comprising:

wherein the sensors send data to the artificial intelligence software;

wherein the artificial intelligence software utilizes this data and makes adjustments to the conditions in the vertical farm and greenhouse in order to maximize yield of the plants;

wherein the type of artificial intelligence is either machine learning, deep learning or neural networks; and wherein some of the changes the artificial intelligence software are made to both the vertical farm and the greenhouse include:

controlling liquid pumps to change flow rates of water or other liquids, and controlling lights to change lighting.

13. A method for artificial intelligence software to manage and optimize energy consumption across vertical farming and a greenhouse, comprising:

wherein there are sensors throughout a nursery and the greenhouse;

wherein there are internal sensors in the greenhouse;

wherein the internal sensors measure air temperature, water temperature, time that lighting is on or off, flow rate, amount of carbon dioxide, humidity, nutrient solution, electrical conductivity of the nutrient solution and pH all within the greenhouse;

wherein the nursery and greenhouse include an ability to change temperature;

wherein heating and cooling is managed per type of plant and stage of growth;

wherein internal sensors sense environmental conditions in the greenhouse and nursery;

wherein there is an outdoor light measurement sensor;

wherein the outdoor light measurement sensor will measure photosynthetic active radiation ("PAR") outdoors;

wherein other sensors will measure light;

wherein data from the outdoor light measurement sensor is sent to artificial intelligence software; and wherein the artificial intelligence software determines how much light various plants in the hydroponic greenhouse needs in order for those plants to maximize the yield from those plants;

wherein the solar battery sends battery percentage data to the artificial intelligence software;

wherein the artificial intelligence software balances power going directly from the grid of solar panels to heating, cooling and pumps, and is balanced with charging the solar battery; and wherein the artificial intelligence software optimizes using sunlight for solar power and optimizes energy consumption in the greenhouse.

14. The method of claim 13, further comprising:

a grid of solar panels that provide solar power;

a solar battery that stores solar power from the grid of solar panels.

15. The method of claim 13, further comprising:

multiple sensors to measure carbon dioxide in both the nursery and greenhouse;

wherein the sensor sends data to the artificial intelligence software;

wherein the artificial intelligence software utilizes this data and makes adjustments to the conditions in the vertical farm and greenhouse in order to maximize yield of the plants.

16. The method of claim 13, further comprising:

a sensor to measure pH of nutrient solution the plants are in;

wherein the sensor sends data to the artificial intelligence software;

wherein the artificial intelligence software utilizes this data and makes adjustments to the conditions in the vertical farm and greenhouse in order to maximize yield of the plants.

17. The method of claim 13, further comprising:

a sensor to measure humidity in the nursery and greenhouse;

wherein the sensor sends data to the artificial intelligence software;

wherein the artificial intelligence software utilizes this data and makes adjustments to the conditions in the greenhouse in order to maximize yield of the plants.

18. The method of claim 13, further comprising:

a sensor to measure ingredients in a nutrient solution in the plants in the vertical farm and greenhouse;

wherein the sensor sends data to the artificial intelligence software;

wherein the artificial intelligence software utilizes this data and makes adjustments to the conditions in the greenhouse in order to maximize yield of the plants.

19. The method of claim 13, further comprising:

wherein the type of artificial intelligence utilized by the artificial intelligence software is either machine learning, deep learning or neural networks.

20. A method for artificial intelligence software to manage and optimize energy consumption across vertical farming and a greenhouse, comprising:

wherein there are sensors throughout the vertical farm and greenhouse;

are internal sensors in the greenhouse;

wherein the internal sensors measure air temperature, water temperature, time that lighting is on or off, flow rate, amount of carbon dioxide, humidity, nutrient solution, electrical conductivity of the nutrient solution and pH all within the greenhouse;

wherein the nursery and greenhouse include an ability to change temperature;

wherein heating and cooling is managed per type of plant and stage of growth;

wherein internal sensors sense environmental conditions in the greenhouse and nursery;

wherein there is an outdoor light measurement sensor; wherein the outdoor light measurement sensor will measure photosynthetic active radiation ("PAR") outdoors;

wherein other sensors will measure light;

wherein data from the outdoor light measurement sensor is sent to artificial intelligence software; and wherein the artificial intelligence software determines how much light various plants in the hydroponic greenhouse needs in order for those plants to maximize the yield from those plants; and wherein some of the changes the artificial intelligence software are made to both the vertical farm and the greenhouse include:

controlling liquid pumps to change flow rates of water or other liquids, and controlling lights to change lighting, wherein the solar battery sends battery percentage data to the artificial intelligence software;

wherein the artificial intelligence software balances power going directly from the grid of solar panels to heating, cooling and pumps, and is balanced with charging the solar battery; and wherein the artificial intelligence software optimizes using sunlight for solar power and optimizes energy consumption in the greenhouse.

* * * * *